United States Patent
Wood

(10) Patent No.: US 6,559,447 B2
(45) Date of Patent: May 6, 2003

(54) LIGHTWEIGHT INFRARED CAMERA

(75) Inventor: Roland Andrew Wood, Bloomington, MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/748,795

(22) Filed: Dec. 26, 2000

(65) Prior Publication Data

US 2003/0057371 A1 Mar. 27, 2003

(51) Int. Cl.⁷ .................................................. H04N 3/09
(52) U.S. Cl. ..................................... 250/332; 250/252.1
(58) Field of Search .............................. 250/332, 252.1, 250/339.05, 339.11, 339.15, 341.8; 348/208, 144

(56) References Cited

U.S. PATENT DOCUMENTS

| | | | |
|---|---|---|---|
| 3,962,537 A | 6/1976 | Kearns et al. | |
| 4,298,887 A | 11/1981 | Rode | 358/113 |
| 4,302,674 A | 11/1981 | Bly | 250/332 |
| 4,654,622 A | 3/1987 | Foss et al. | 338/14 |
| 4,720,738 A | 1/1988 | Simmons | 357/30 |
| 4,752,694 A | 6/1988 | Hegel et al. | 250/208.1 |
| 5,220,188 A | 6/1993 | Higashi et al. | 257/467 |
| 5,220,189 A | 6/1993 | Higashi et al. | 257/467 |
| 5,260,225 A | 11/1993 | Liu et al. | 438/54 |
| 5,286,976 A | 2/1994 | Cole | 250/349 |
| 5,293,041 A | 3/1994 | Kruse | 250/338.3 |
| 5,303,050 A | 4/1994 | Nishimura et al. | |
| 5,420,419 A | 5/1995 | Wood | 250/338.4 |
| 5,422,475 A | 6/1995 | Norton | 250/216 |
| 5,449,910 A | 9/1995 | Wood et al. | 250/338.1 |
| 5,479,206 A | 12/1995 | Funazaki et al. | |
| 5,489,776 A | 2/1996 | Lung | 250/332 |
| 5,534,111 A | 7/1996 | Hocker et al. | 216/15 |
| 5,654,549 A * | 8/1997 | Landecker et al. | 250/332 |
| 5,675,149 A | 10/1997 | Wood et al. | 250/332 |
| 5,688,699 A | 11/1997 | Cunningham | 437/3 |
| 5,729,019 A | 3/1998 | Krafthefer et al. | 250/353 |
| 5,811,808 A | 9/1998 | Cannata | 250/332 |
| 5,812,309 A | 9/1998 | Thoma et al. | 359/357 |
| RE36,136 E | 3/1999 | Higashi et al. | 338/18 |
| 5,895,233 A | 4/1999 | Higashi | 438/107 |
| 5,903,659 A | 5/1999 | Kilgore | 383/103 |
| 5,939,971 A | 8/1999 | Yong | 338/15 |
| 5,999,211 A | 12/1999 | Hedges et al. | 348/144 |
| 6,011,876 A | 1/2000 | Kishner | 383/284 |
| 6,023,061 A | 2/2000 | Bodkin | 250/332 |
| 6,026,337 A | 2/2000 | Krigbaum et al. | 701/13 |
| 6,031,231 A | 2/2000 | Kimata | 250/332 |

(List continued on next page.)

FOREIGN PATENT DOCUMENTS

| | | |
|---|---|---|
| EP | 0550068 A | 7/1993 |
| WO | 9610883 A | 4/1996 |

OTHER PUBLICATIONS

J. Krist, R. Hook, "The Tiny Tim User's Guide", Version 5.0, Nov. 1999, found at http://www.stsci.edu/software/tinytim, 29 pages.

(List continued on next page.)

*Primary Examiner*—Constantine Hannaher
*Assistant Examiner*—Otilia Gabor
(74) *Attorney, Agent, or Firm*—Kris T. Fredrick

(57) ABSTRACT

A lightweight camera or detector that does not require a shutter, chopper or thermoelectric stabilizer. Lightweight materials and lightweight packaging techniques are used, and in some embodiments, some or all of the calibration, compensation and processing hardware are moved from the camera itself to a remote station. Such a shutterless, lightweight, IR camera, which may operated at ambient temperature, can be mounted on a micro air vehicle (MAV) or the like, with the raw IR sensor data received and processed by a ground station.

24 Claims, 6 Drawing Sheets

U.S. PATENT DOCUMENTS

| | | | |
|---|---|---|---|
| RE36,615 E | 3/2000 | Wood | 338/18 |
| 6,036,872 A | 3/2000 | Wood et al. | 216/2 |
| 6,046,485 A | 4/2000 | Cole et al. | 257/428 |
| RE36,706 E | 5/2000 | Cole | 250/349 |
| 6,097,031 A | 8/2000 | Cole | 250/370.06 |
| 6,359,276 B1 * | 3/2002 | Tu | 250/338.1 |

OTHER PUBLICATIONS

Internet Article: "Image Restoration," ra.stsci.edu/documents/SUG/UG_29.html, Oct. 23, 2000, 6 sheets.

Internet Article: Image Scientist,: www.image-scientist.com/order.htm, Oct. 23, 2000, 1 sheet.

Internet Article: "Lenses," elchem.kaist.ac.kr/vt/chem.-ed/optics/lenses.htm, Oct. 23, 2000, 4 sheets.

Internet Article: "MPRL—Massively Parallel Richardson–Lucy," huey.jpl.nasa.gov/mprl, Oct. 23, 2000, 2 sheets.

Internet Article: "Computer Aided Analysis and Restoration of Images," www.ndt.net/article/v04n12/palles1/palles1.htm, Oct. 23, 2000, 4 sheets.

Trussell, H.J., et al., "Sectioned Methods for Image Restoration," *IEEE Transactions on Acoustics, Speech, and Signal Processing,* vol. ASSP-26, No. 2, Apr. 1978, pps. 157–164.

Trussell, H.J., et al., "Image Restoration of Space–Variant Blurs by Sectioned Methods," *IEEE Transactions on Acoustics, Speech, and Signal Processing,* vol. ASSP-26, No. 6, Dec. 1978, pps. 608–609.

Richardson, William Hadley, "Bayesian–Based Iterative Methods of Image Restoration," *Journal of the Optical Society of America,* vol. 62, No. 1, Jan. 1972, pps. 55–59.

Lucy, L,B., An Iterative Technique for the Rectification of Observed Distributions, *The Astronomical Journal,* vol. 79, No. 6, Jun. 1974, pps. 745–754.

Boden, A.F. t al., "Massively Parallel Spatially Variant Maximum–likelihood Restoration of Hubble Space Telescope Imagery," *Journal of the Optical Society of America,* vol. 13, No. 7, Jul. 1996, pps. 1537–1545.

Snyder, Donald L. et al., "Image Recovery From Data Acquired with a Charge–Coupled–Device Camera," *Journal of the Optical Society of America,* vol. 10, No. 5, May 1993, pps. 1014–1023.

Internet Article: "Encyclopedia Britannica, Figure 8: Lens aberrations," www.britannica, com/bcom/eb/article/single_image/0,5716,7073+asmbly_id,00,html, Oct. 23, 2000, 1 sheet.

Hewish, M: 'A Bird in the Hand Miniature and Micro Air Vehicles Challenge Conventional Thinking'; Jane's International Defense Review; Jane's Information Group, GB; vol. 32, Nov. 1999. pp. 22–28.

Patent Abstracts of Japan: vol. 2000, No. 01; Jan. 31, 2000; & JP11285407A (Sony Corp.) Oct. 8, 1999 abstract.

* cited by examiner

LIGHTWEIGHT INFRARED CAMERA

CROSS REFERENCE TO RELATED APPLICATION

The present application is related to U.S. patent application Ser. No. 09/748,756, filed Dec. 26, 2000, entitled "LENS FOR INFRARED CAMERA", and U.S. patent application Ser. No. 09/748,784, filed Dec. 26, 2000, entitled "MICROBOLOMETER OPERATING SYSTEM."

FIELD OF THE INVENTION

The present invention relates generally to infrared (IR) cameras and detectors. More particularly, the present invention relates to lightweight infrared (IR) cameras and detectors.

BACKGROUND OF THE INVENTION

Infrared cameras and detectors in general, and microbolometer cameras in particular, are well known to those skilled in the art. See, for example, U.S. Pat. Nos. 5,688,699; 5,999,211; 5,420,419; and 6,026,337, all of which are incorporated herein by reference. Infrared microbolometer cameras typically include an array of infrared sensitive sensing detectors, each having a resistance that changes with temperature, with each detector having an infrared absorber that may be formed in several ways. See, for example, U.S. Pat. Nos. 5,939,971 and 5,729,019, herein incorporated by reference.

During operation, the incoming infrared radiation heats each sensing detector in proportion to the amount of infrared radiation received. The sensing detectors are then queried, typically one by one, to determine the resistance of the sensing detectors, and thus the amount of infrared radiation received. Typically, supporting electronics are provided with the camera to process the detector output signals, provide calibration and compensation, and provide a resulting image.

Because heat is used to measure the amount of incoming infrared energy, changes in the ambient temperature of the microbolometer array can significantly affect the detector signals. To compensate for this, many infrared cameras or detectors have a thermoelectric stabilizer to regulate the temperature of the array. In one example, thermoelectric stabilizers are used to maintain the array temperature at a known value. A limitation of using thermoelectric stabilizers is that they can draw significant power and can add significant weight to the system.

Because of manufacturing tolerances, each sensing detector in the camera may have a slightly different zero point than other detectors within the system. To compensate for these detector-to-detector differences, many infrared cameras or detectors have a means for providing a zero radiation baseline value, which is made available to interpret or calibrate the detector output signals. One method for providing the zero radiation baseline is to use a shutter or chopper to periodically block the incoming infrared energy. When the shutter or chopper is activated, a zero radiation baseline is read and stored. A limitation of this approach is that the shutter or chopper can add significant complexity and weight to the system, which for some applications, can be particularly problematic. Another approach for providing a zero radiation baseline is to periodically point the camera at a uniform infrared source such as the sky. This, however, can require significant control circuitry to periodically change the direction of the camera, again adding weight to the system.

For some applications, the weight of the infrared camera can be important. For example, in lightweight micro air vehicle (MAV) applications, the weight of the infrared camera can significantly impact the size, range and other critical performance parameters of the vehicle. For these and other applications, a lightweight infrared camera would be highly desirable.

SUMMARY OF THE INVENTION

The present invention overcomes many disadvantages of the prior art by providing a lightweight infrared camera. This is accomplished primarily by eliminating the shutter or chopper, eliminating the thermoelectric stabilizer, using lightweight materials and lightweight packaging techniques, and/or moving some of the calibration, compensation, processing and display hardware from the camera to a remote station.

In one illustrative embodiment of the present invention, the infrared camera includes a microbolometer array as the radiation sensing device. The microbolometer array includes a plurality of addressable radiation sensing detectors each having an output that depends on the intensity of the infrared radiation that strikes the detector.

To reduce the weight of the infrared camera, the measured infrared signals may be transmitted to a remote station in analog or digital form. The signals may be transmitted by wireless or optical fibers or wires as best suits the application. The remote station receives the transmitted signals, and formats the signals into an array that corresponds to the original microbolometer detector array. The remote station may include the necessary processing hardware for compensating both inter-detector differences and variations in the ambient temperature of the transmitting detector array. A temperature sensor also may be provided near the microbolometer array, which can send a temperature signal that is transmitted to the remote station for use in signal calibration and compensation, if desired. By moving the calibrations compensation and/or processing hardware from the infrared camera to the remote station, significant weight savings can be realized in the infrared camera.

The calibrating and compensating values are typically dependent upon the temperature of the microbolometer array, typically being different for each bolometer array temperature and for each individual sensing detector on the array. The remote station may select the proper calibrating and compensating values to apply. The required numbers may be stored in the remote station, or generated for each individual sensing detector using algorithms which use the array temperature as a variable.

In camera applications in which the scene has known statistical properties, for example, when each sensing detector views a target which on average is identical to every other sensing detector, as is usually the case in MAV and many other moving-vehicle applications, the compensating and calibrating values may also be computed within the ground station by using multiple measured values of each sensing detector signal.

Another way to reduce the weight of the infrared camera is to provide the microbolometer in an integrated vacuum package (IVP). An integrated vacuum package may include an infrared transmitting cover that includes a cavity that fits over the microbolometer detector array. Silicon is a typical cover material. The silicon cover is bonded to the microbolometer substrate to collectively form a lightweight vacuum package. In a preferred embodiment, the silicon cover does not extend over the bonding pads of the microbolometer.

Configured in this way, the IVP may be directly bonded to a motherboard, with wire bonds, bump bonds or other bonding mechanisms used to directly connecting the bonding pads of the microbolometer to bond pads on the motherboard. Motherboards are typically ceramic. This is known as "hybridizing" the IVP with the motherboard. This may eliminate the need for a conventional chip carrier, which may further reduce the weight of the camera.

It is also contemplated that any supporting electronics in the camera, such as A/D converters and/or transmitting circuitry, may be hybridized with the ceramic motherboard. That is, rather than including the supporting electronics in conventional packages, the integrated circuit dice of the supporting electronics may be directly bonded to the ceramic motherboard, with wire bonds, bump bonds or the like connecting the supporting electronics to the motherboard. This may also reduce the weight of the camera.

The infrared camera may also use a lens system. The lens system is used to focus the incoming infrared radiation on the microbolometer array of detectors. The lens is typically a germanium lens, and may be a singlet, doublet, or triplet. The lens is preferably spaced from the ceramic motherboard by lightweight supports made from a material such as titanium. The use of doublets or singlets can further reduce the weight of the infrared camera. If doublets or singlets are used, the resulting image blur may be removed by the ground station.

DETAILED DESCRIPTION OF THE INVENTION

Figure 1:
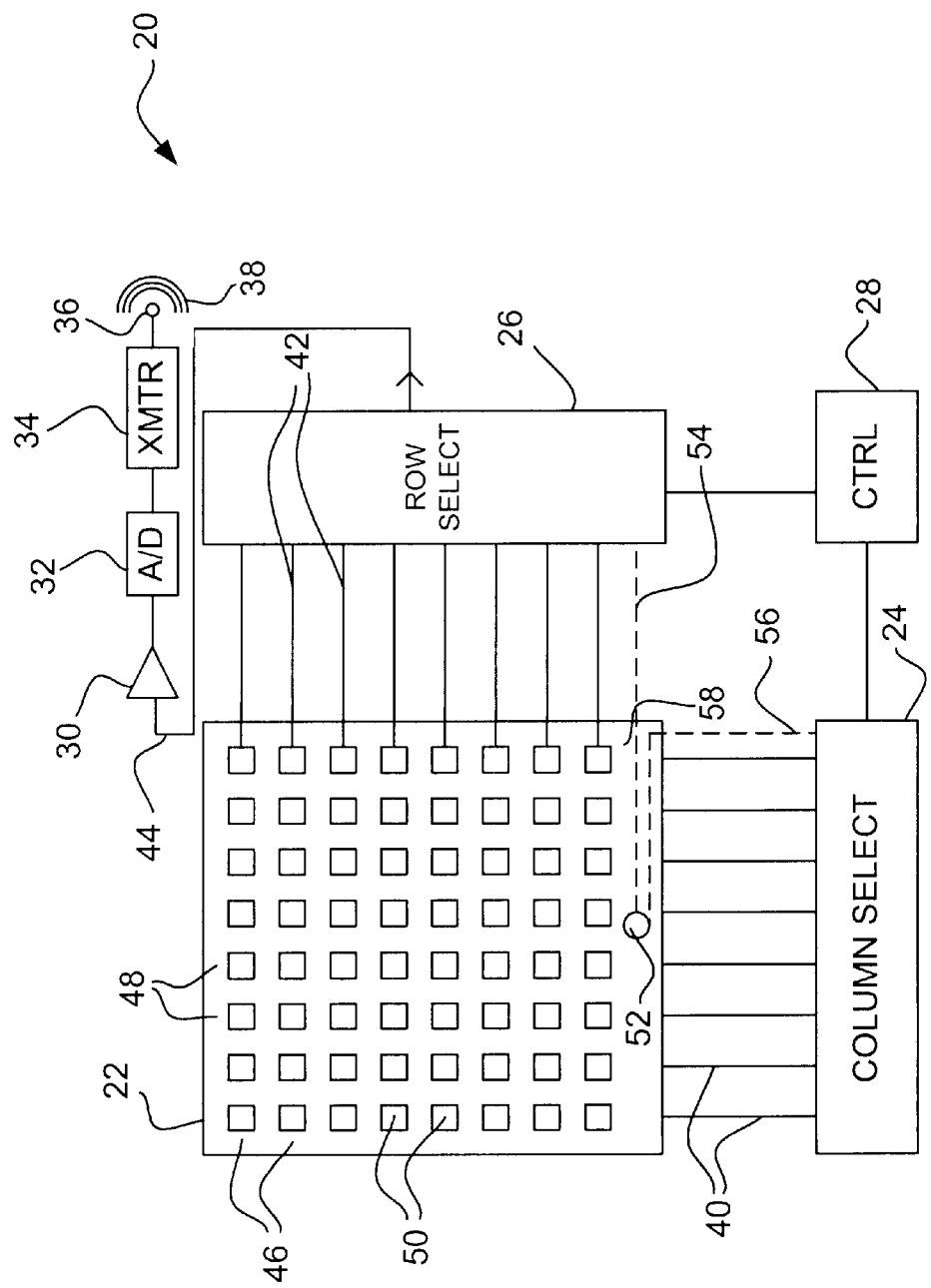
FIG. 1 is a schematic view of a shutterless radiation detector device having a plurality of radiation sensing detector, a multiplexer, and a transmitter.

FIG. 1 illustrates a first illustrative infrared camera in accordance with the present invention. In this embodiment, the infrared camera only contains an array of detectors for receiving the infrared energy, measuring array temperature, and transmitting the raw data to a remote station. An illustrative remote station is shown in, for example, FIG. 2.

The infrared camera of FIG. 1 is generally shown at 20, and includes an array of radiation detectors 22, a column selector 24, a row selector 26, a controller 28, and an optional temperature sensor 52. Radiation detector array 22 includes numerous radiation sensing detectors 50 which, in a preferred embodiment, are infrared sensing microbolometers. Radiation detectors 50, in the embodiment illustrated, are deployed in a series of columns 48, and rows 46. A controller 28 is provided for controlling column selector 24 and row selector 26. Controller 28 can include a counter for stepping selectors 24 and 26 through a series of nested row and column addressing sequences. In one embodiment, a single radiation detector is addressed or selected for a reading at any instant in time by the selection of a single column selector line 40 and a single row selector line 42. In another embodiment, all detectors in a column are addressed or selected for reading simultaneously, by the selection of a single column and accepting all row signals into row selector 26, after which individual detector signals are passed out sequentially to the amplifier 30. In one embodiment, the array of radiation detectors 22, the column multiplexer or selector 24, the row multiplexer or selector 26, the controller 28, and the optional temperature sensor 52 are all part of the microbolometer device and are all formed on the same substrate. In a preferred embodiment, a 160 by 120 (160× 120) array of 35- micrometer sized microbolometers is used to form the microbolometer array.

In another embodiment, detector offset signals may be applied directly to the array of radiation detectors, so as to partially compensate the individual radiation detectors for zero offsets. Such non-uniformity correction is disclosed in U.S. Pat. No. 4,752,694. With particular readout circuits described in this invention, offset correction circuits similar to those in U.S. Pat. No. 4,752,694 may be used, or other offset correction circuits well known to persons skilled in the electronic arts may be employed, as in U.S. Pat. No. 5,811,808.

When a particular detector signal is passed to readout line 44, that signal corresponds to the radiation intensity striking the selected radiation detector, which can be amplified by an amplifier. 30. The amplified signal is then provided to an analog-to-digital converter 32, which can, in turn, provide an output signal to a transmitter 34. In the embodiment illustrated, transmitter 34 is coupled to an antenna 36 for emitting wireless signals 38. In one embodiment, signals 38 are radio frequency signals transmitted without wires, while another embodiment uses optical wireless transmissions, which can include infrared signals. Signals 38 can also be transmitted over electrical wires or optical fibers.

It is contemplated that temperature sensor 52 can be selected or addressed by a first temperature sensor selector line 56 with the temperature sensor value being read out by a temperature sensor readout line 54 which may be coupled to radiation detector readout line 44. The temperature sensor value may be added as an additional value at the beginning or the end of a series of transmitted radiation detector values. In another embodiment, the temperature sensor 52 is coupled independently to transmitter 34, and the temperature sensor value is periodically transmitted to the remote station.

Figure 2:
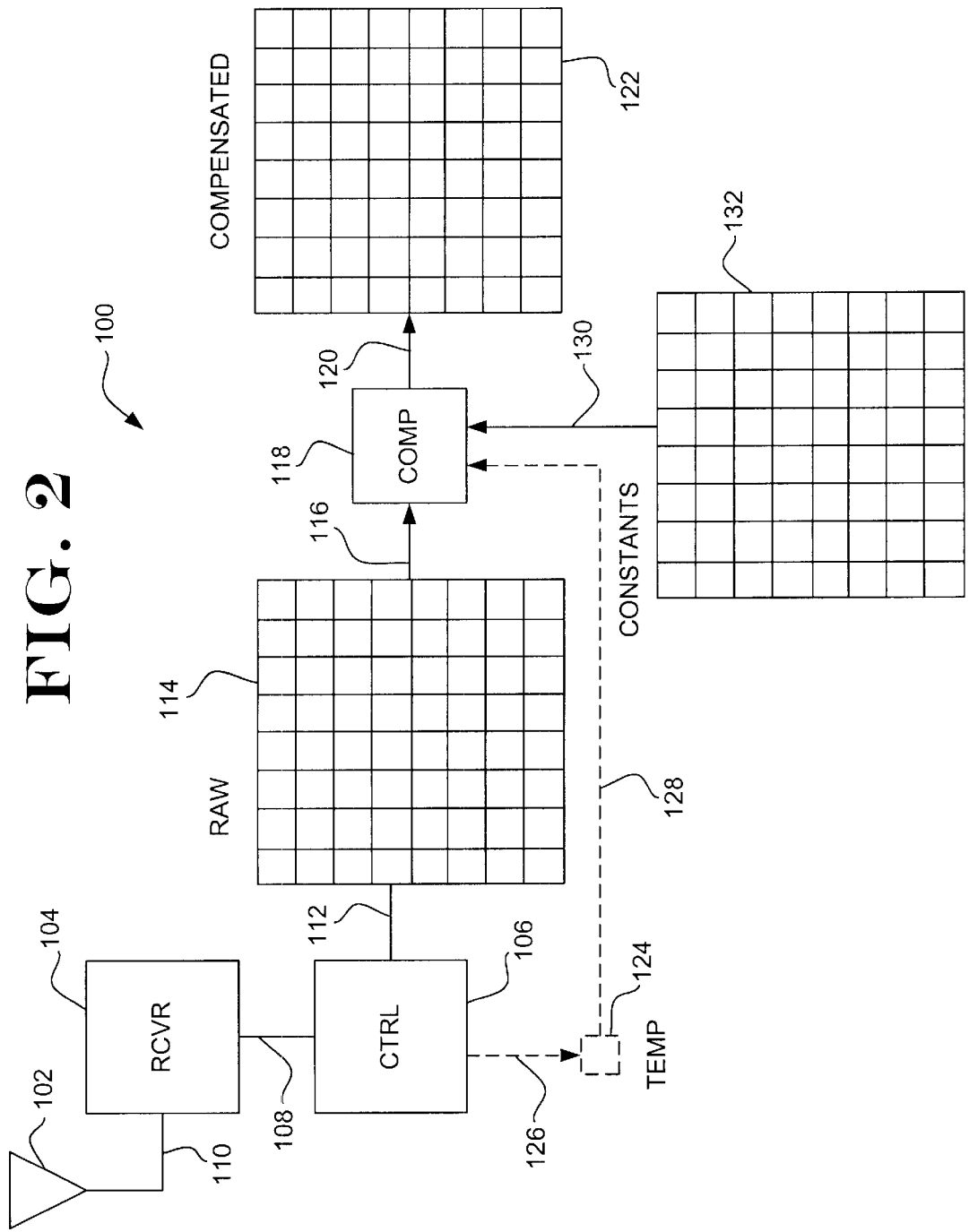
FIG. 2 is a receiving system for receiving transmitted signal values including a temperature compensator for compensating raw, received signal values from a system as in FIG. 1, the compensator using values which vary with array temperature, and which are typically different for each sensing detector.

Referring now to FIG. 2, a remote station 100 is illustrated for receiving a series of transmitted radiation detector values and array temperature signals from the camera 20 of FIG. 1. Remote station 100 can include an antenna 102 coupled to a receiver 104 through line 110, with receiver 104 being coupled to a controller 106 though a line 108. Controller 106 can provide a raw data structure, array or device 114 with a plurality of raw radiation detector data values through a line 112. Storage device array 114 can be any device capable of storing the plurality of radiation detector values obtained from the transmitting system. The raw values can be fed to a compensator 118 through a connecting line 116. In the embodiment illustrated in FIG. 2, a series of constants, such as zeroing or amplification constants, may be stored in a data structure, array or device 132 and provided to comparator 118 through a connecting line 130.

In some embodiments, a temperature value is received from the transmitting system and stored in a temperature storage location 124, either as a temperature or a raw detector output value. Temperature storage location 124 can be supplied by controller 106 which can retrieve the temperature value from the stream of received radiation detector values and supplied to temperature storage location 124 through line 126. The temperature value can be retrieved by compensator 118 through line 128. In one embodiment, compensator 118 takes the raw radiation detector signal values 114, the temperature values stored in device 124 and the constants stored in device 132, and calibrates or compensates the raw radiation detector signal values both for inter-detector differences and for the array ambient temperature. The result may be a series of compensated values that can be stored in a compensated storage data structure, device, or array 122 through line 120.

In one embodiment, detector array 22 of FIG. 1 is tested at the factory to measure differences from detector to detector. In particular, in one embodiment, the output values of each detector at a baseline of zero (0) received radiation is stored in a table such as constant array 132 of FIG. 2, plus a number of array temperatures. The constants stored in array 132 can be used to adjust the values received from each detector 50 of FIG. 1 to effectively zero the values received by receiver 104 and stored in raw value array 114.

A single temperature compensation model may be stored and used by compensator 118 to adjust the received values of all detectors in raw array 114 according to the onboard temperature of detector array 22. Alternatively, a separate model may be provided for each detector across a range of array temperatures. In this embodiment, the temperature dependence of each detector 50 of FIG. 1 can be measured at the factory or at some time prior to deployment of the infrared camera 20. The temperature dependence of each detector 50 may be independently stored, for example, by storing a different set of temperature coefficients in constant storage array 132. Alternatively, optional temperature storage location 124 is not provided, and the compensation performed by compensator 118 eliminates only the inter-detector differences.

It is contemplated that the controller 106 may retrieve the temperature data by identifying a particular location in the received data stream, thus isolating the onboard temperature sensor value. Alternatively, the temperature sensor value may be effectively marked by a bit or a particular series of bits to identify the temperature sensor value as a temperature value, rather than a received radiation intensity value.

Figure 3:
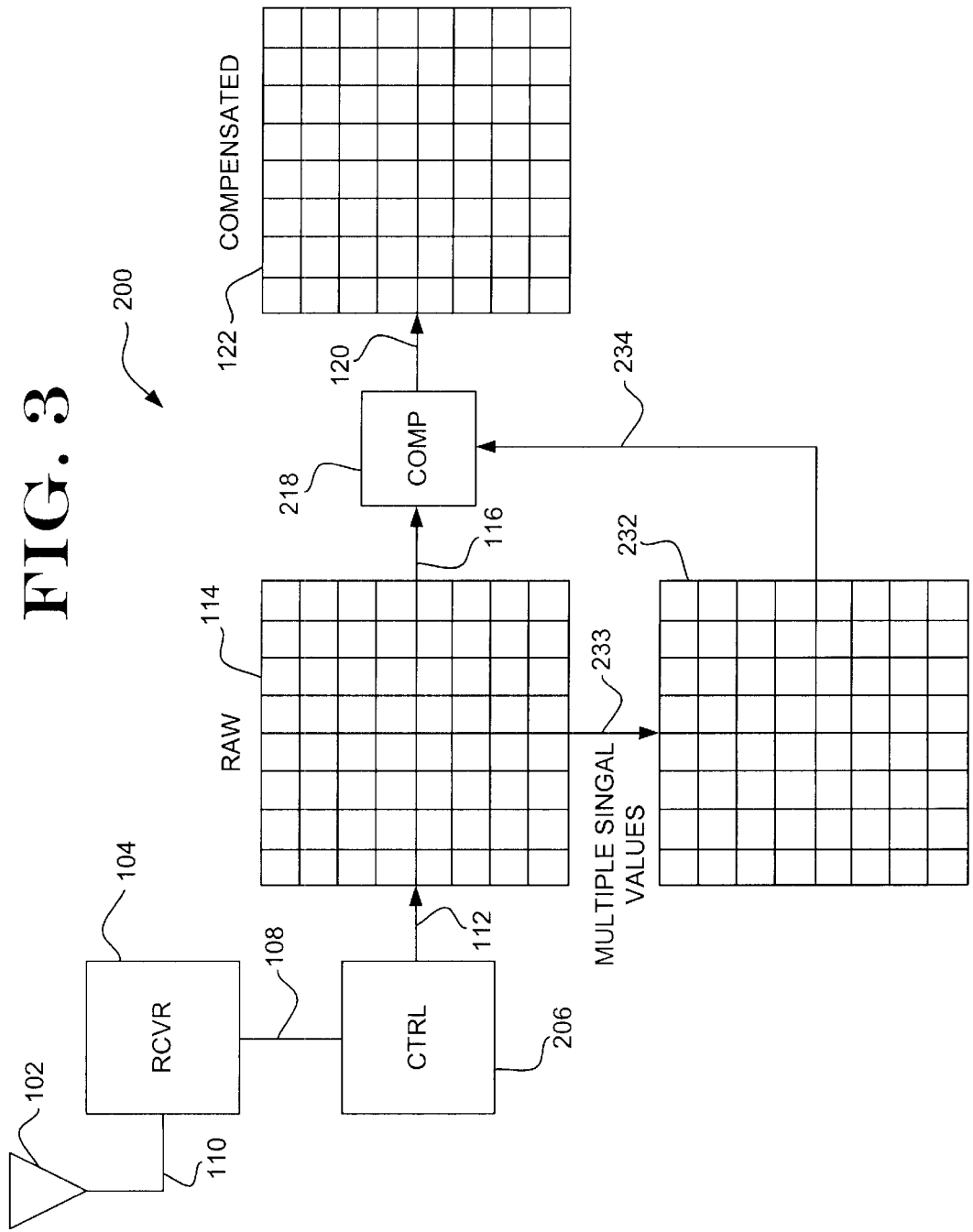
FIG. 3 is a schematic view of a receiving system for receiving transmitted radiation signal values from a system as in FIG. 1, including a compensator using multiple signal values to compensate for inter-detector differences.

Referring now to FIG. 3, another remote station 200 is illustrated which can be used to receive transmitted radiation detector signal values as transmitted by infrared camera 20 of FIG. 1. Remote station 200 includes many of the same components previously described and identically numbered in FIG. 2, which are not discussed further. Receiving system 200 includes a controller 206 for processing received signals through input line 108, outputting raw detector data values into raw detector storage device 114. In this embodiment, the raw detector values can be stored over time on a detector-by-detector basis, providing multiple signal values for each detector through input line 233. The signal values, averaged over time, should be substantially identical for all detectors 50 if the target is similarly identical. However, due to the inter-detector differences, detectors that received essentially identical cumulative radiation, will nonetheless output slightly different radiation signal values due to the inter-detector differences. These differences, or the cumulative values, may be stored in time average data structure or array 232.

In one embodiment, the average signal values over time are used to effectively normalize the detector values. In another embodiment, time average array 232 stores the positive or negative number required to bring the detector value to the average over time. In this embodiment, a compensator 218 can obtain the raw data values through input line 116 and the time average values through line 234, producing a compensated array of values stored in compensated data array 122. Compensation can be applied to the raw detector values to reduce or eliminate inter-detector differences using time average values and a received onboard temperature measurement, such as illustrated in FIG. 2. Further, a temperature correction model may be performed by compensator 218, as discussed with respect to FIG. 2. In one embodiment, such as shown in FIGS. 2 and 3, if a camera lens is employed which produces a known image blurring, the compensators 118 and 218 may be used to remove the image blur to an acceptable degree.

Referring again to FIGS. 2 and 3, in one embodiment, the temperature compensation and inter-detector compensation and image de-blurring can be provided by a general purpose computer executing software operating upon the received detector data. In one embodiment, the data is received through input line 108, separated into raw data and, optionally, temperature data, and stored into arrays or other data structures within a general purpose computer operating a computer program. In this embodiment, the general purpose computer running the program can retrieve the needed constants and raw data, from data stores such as arrays. The retrieved data can be compensated within a compensating portion of the program, and output to a data storage area containing the compensated detector values. In a similar manner, with respect to FIG. 3, the time averaged values stored in array 232 of FIG. 3 can be averaged within a general purpose computer executing a computer program.

As can be seen from inspection of FIGS. 1–3, the bulk of the processing can be performed in the remote station, rather than in the infrared camera. In particular, the temperature compensation and inter-detector or inter-pixel compensation or normalization, and image de-blurring can be performed at the receiving end, for example, at a ground station. In this way, a lightweight, sometimes airborne, infrared camera can have the temperature compensation and image processing offloaded to the ground station.

Figure 4:
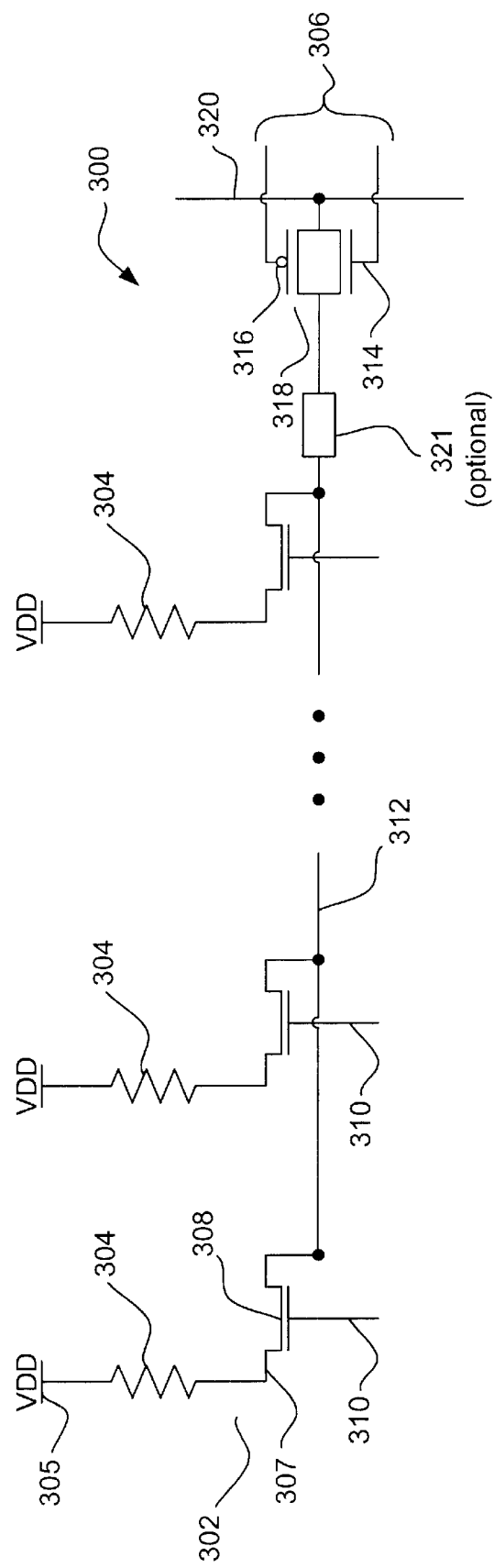
FIG. 4 is a schematic view of a row of infrared detectors and sampling circuitry which is used in one embodiment of the radiation detector device of FIG. 1.

Referring now to FIG. 4, a single row of detectors 300 in a microbolometer array with readout is illustrated, for an embodiment having infrared detectors as the radiation detectors discussed with respect to FIG. 1. Detector row 302 can include infrared sensitive variable resistance elements 304 which are supplied with a reference voltage at 305 providing a variable current therethrough at 307. Each resistance element 304 can be selected or addressed by a row selector circuit 306 and a column selector line 310. When the corresponding row and column are selected, the selected detector element 304 may be read.

In the embodiment illustrated in FIG. 4, an n-type transistor 308 is switched by the proper selection of a row line 306 and a column line 310. Row selector circuit 306 includes a transmission gate 318 which includes a p-type transistor 316 and an n-type transistor 314. When the reading of a row is desired, only one column addressing line 310 and one row readout line 306 are typically selected. Current then flows from the power supply 305, through the selected variable resistance element 304, through the selected transistor 308 to the selected row readout line 312, and out a common readout line 320. In another embodiment, in which all detectors in a column are addressed or selected for reading simultaneously by the selection of a single column, an optional integrator 321 is provided for each row within the row selector, and means 314 for passing individual detector signals out sequentially to the amplifier 30.

Figure 5:
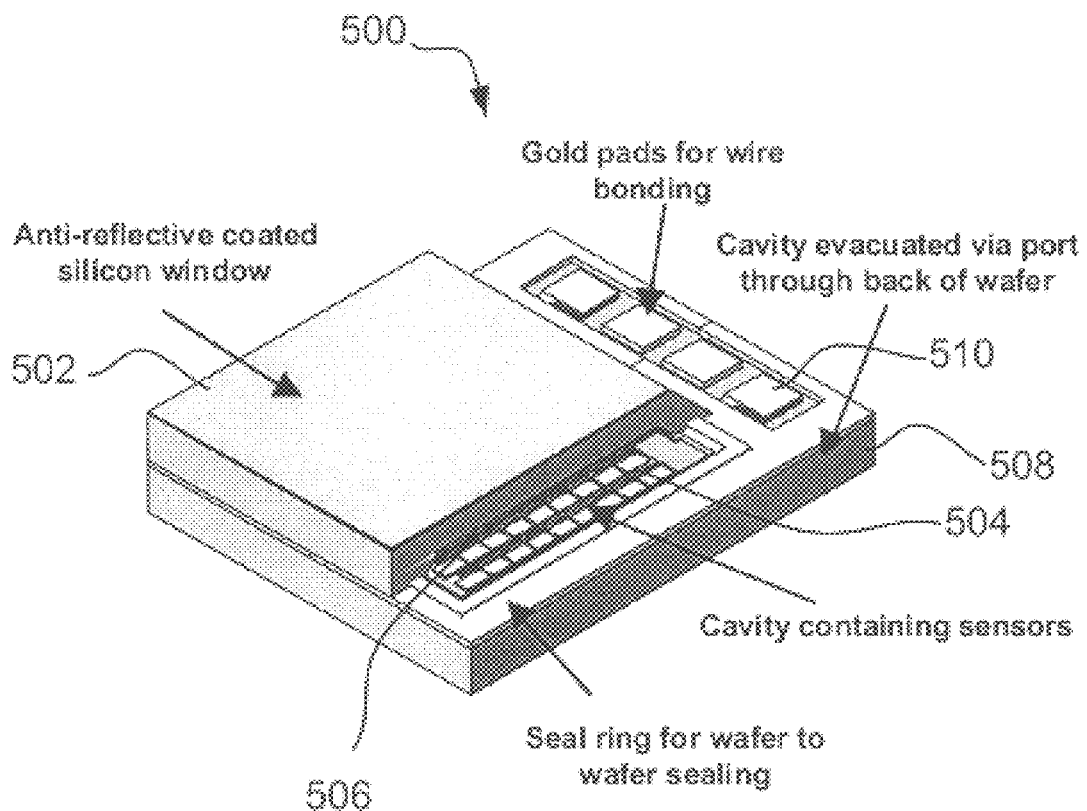
FIG. 5 is a cutaway, perspective view of an integral vacuum package including an infrared transparent silicon top cap providing a vacuum environment for a bolometer array.

Referring now to FIG. 5, an integral vacuum package (IVP) 500 suitable for use with the current invention is illustrated. IVP 500 preferably includes an infrared transparent silicon top cap 502. The silicon top cap 502 is preferably micromachined to include a cavity that is in registration with the microbolometer detector elements 508. The silicon top cap 502 is bonded to the substrate of the microbolometer array 508 to provide a vacuum environment for a microbolometer detector elements 506. The bonding is typically performed on a wafer scale.

In a preferred embodiment, the silicon top cap 502 is provided with vias so that it does not extend over the bonding pads 510 of the microbolometer. Configured in this way, the IVP 500 may be directly bonded to a ceramic motherboard 528, with wire bonds, bump bonds or other bonding mechanisms used to directly connecting the bonding pads 510 of the microbolometer to bond pads on the ceramic motherboard 528. This is known as "hybridizing" the IVP 500 with the ceramic motherboard 520, as better shown in FIG. 6. This may eliminate the need for a conventional chip carrier, which may reduce the weight of the camera.

It is also contemplated that any supporting electronics in the camera, such as A/D converters and/or transmitting circuitry, may be hybridized with the ceramic motherboard 528. That is, rather than including the supporting electronics in conventional packages, the integrated circuit dice 530 of the supporting electronics may be directly bonded to the ceramic motherboard 528, with wire bonds, bump bonds or the like connecting the supporting electronics to the ceramic motherboard 528. This may also reduce the weight of the camera.

Figure 6:
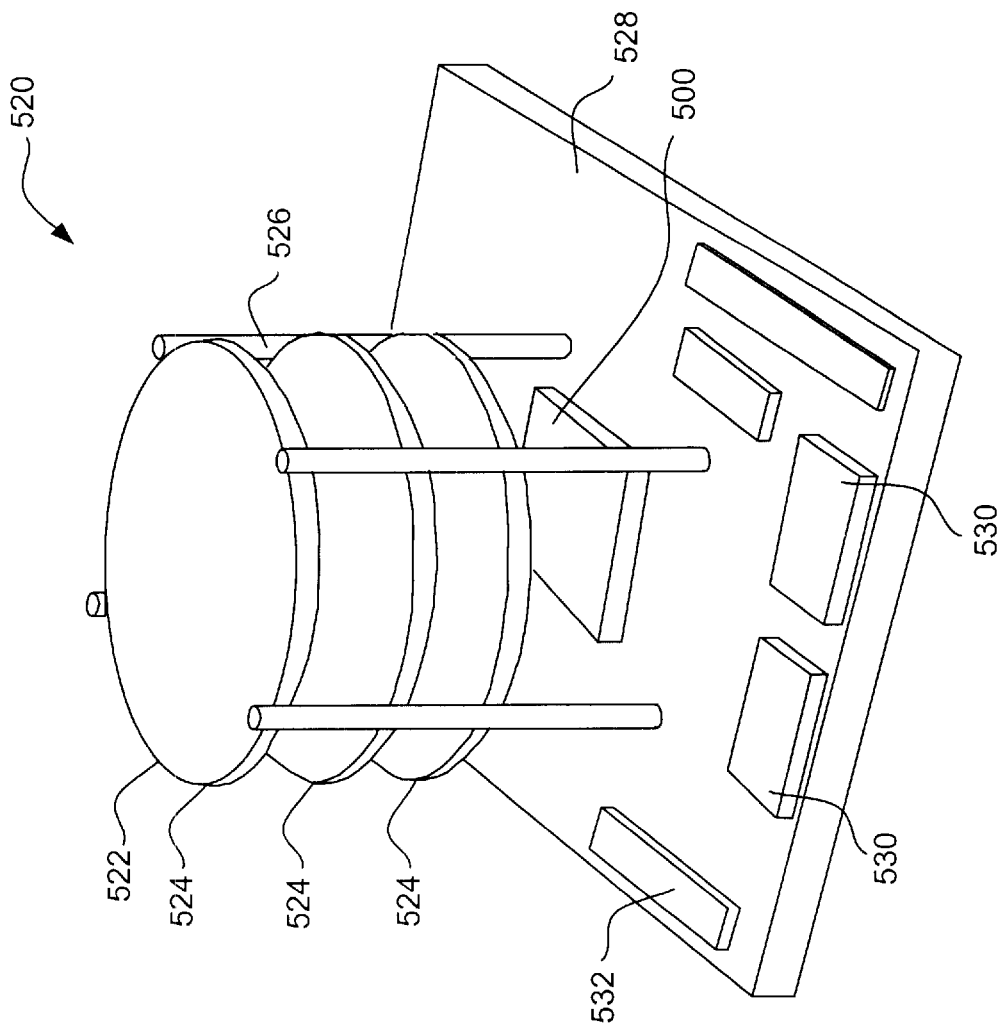
FIG. 6 is a perspective view of a camera system including a triplet lens spaced from an integral vacuum package array as in FIG. 5 by multiple legs upon a hybrid circuit board.

FIG. 6 shows a perspective view of an infrared camera 520 in accordance with a preferred embodiment of the present invention. IVP 500 is shown directly bonded to a ceramic motherboard 528. The infrared camera 520 also includes a germanium triplet lens 522 including three individual germanium lens elements 524 which can be spaced apart by multiple titanium spacer legs 526 mounted on the ceramic motherboard 528. The lens system is used to focus the incoming infrared radiation on the microbolometer array in the IVP 500. Radiation shields may be added around the array (not shown) to reduce the stray radiation. The ceramic motherboard is preferably of multi-layer construction and is about one inch (1") on each side. Ceramic is preferably used to further reduce the weight of the camera 520. In one embodiment, infrared camera 520 accepts DC supply voltages and supplies 12-bit digital data corresponding to the data to the transmitter provided by microbolometer array 506 in IVP 500.

As can be seen from inspection of FIG. 6, infrared camera 520, in the embodiment illustrated, requires no shutter and requires no temperature stabilization, and may use a light lens that produces a blurred image. As indicated above, onboard temperature regulation can add significant weight to the camera. The preferred lack of shutter or chopper, temperature stabilizer, high quality lens and complex onboard processing can combine to provide an extremely lightweight infrared camera or detector. In one embodiment, camera system 520 weighs less than 25 grams, or more preferably less than 10 grams.

A lightweight infrared camera, as can be provided by the present invention, is ideal for several applications. In one application, a lightweight micro air vehicle (MAV) can be used with downloading capabilities to relay the raw infrared image of a selected area over an RF link to a ground station. In another application, an expendable, single use, lightweight infrared camera can be deployed through use of a downwardly drifting projectile slowed by a small chute to provide maximum time over the recognizance target. In another application, the present invention may be incorporated into a helmet mounted sensing device. Numerous other applications are contemplated.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. An infrared camera system comprising:
   a lightweight infrared camera having a focusing optical system, a plurality of radiation detector elements, each detector element providing a raw output signal that is related to the level of radiation striking the detector element, and a transmitter coupled to said plurality of radiation detector elements for transmitting the raw detector output signals; and
   a remote receiver for receiving the transmitted raw detector output signals.

2. The infrared camera system as in claim 1, wherein the plurality of radiation detector elements are microbolometers.

3. An infrared camera system as in claim 2, wherein the infrared camera does not include a temperature regulator and operates at ambient temperature.

4. An infrared camera system as in claim 2, wherein the infrared camera does not include a shutter or chopper.

5. An infrared camera system as in claim 1, wherein the remote receiver further comprising compensating means for providing compensation to the received raw detector output signals.

6. An infrared camera system as in claim 5, wherein the plurality of radiation detector elements have detector-to-detector variations, and said compensating means compensates for the detector-to-detector variations.

7. An infrared camera system as in claim 5, wherein the plurality of radiation detector elements have a sensitivity to an ambient temperature, and said compensating means compensates for the sensitivity to ambient temperature.

8. An infrared camera system as in claim 5, wherein the compensation means includes:
   a plurality of calibration values for compensating the received raw detector output signals, and
   a compensator for compensating said received raw detector output signals as a function of said calibration values.

9. An infrared camera system as in claim 5, wherein the compensation means compensates the received raw detector output signals at least in part as a function of multiple values of the received raw detector output signals.

10. An infrared camera system as in claim 5, wherein the compensation means compensates the received raw detector output signals at least in part by adjusting a baseline for the received raw detector output signals.

11. An infrared camera system as in claim 5, in which the compensation means receives a transmitted temperature signal, and wherein said compensation means compensates the received raw detector output signals as a function of the transmitted temperature signal.

12. A lightweight infrared camera, comprising:
    a focusing optical system;
    a plurality of detector elements having outputs varying as a function of the amount of radiation striking said detector elements;
    a selector for selecting a particular detector element and outputting an uncalibrated or partially calibrated detector element output corresponding to the selected detector element; and
    a transmitter coupled to said selector for transmitting a signal corresponding to the uncalibrated or partially calibrated detector element output to a remote receiver.

13. A lightweight infrared camera as in claim 12, wherein the selector has means for partially compensating the selected detector element for zero offset.

14. A lightweight camera as in claim 12, further comprising a temperature sensor having an output wherein said temperature sensor output is operably coupled to said transmitter and said transmitter transmits at least one signal corresponding to said temperature sensor output.

15. A lightweight camera as in claim 12, wherein said detectors are disposed in a focal plane array.

16. A lightweight camera as in claim 15, wherein said detectors are disposed within an integrated vacuum package.

17. A lightweight camera as in claim 12, in which said optical system comprises a lens supported by a frame, wherein said frame is operably coupled to said lens such that said lens is disposed at a distance from said detectors.

18. A lightweight camera as in claim 17 in which the lens is blurry, and at least some of the blur is removed at the remote station.

19. A lightweight camera as in claim 17, wherein said frame is formed of metal.

20. A lightweight camera as in claim 12, wherein said transmitter is a radio frequency transmitter.

21. A lightweight camera, comprising:
    a ceramic motherboard;
    a microbolometer array mounted to the ceramic motherboard;
    a lens supported by a frame, the frame mounting the lens a set distance from said microbolometer array;
    a selector for selecting and outputting an uncalibrated or partially calibrated signal from the microbolometer array;
    a transmitter for transmitting the output signal from the selector; and
    a remote station for receiving the transmitted output signal.

22. A lightweight camera as in claim 21, wherein the microbolometer array is provided in an integrated vacuum package.

23. A lightweight camera as in claim 21, wherein the lens includes germanium.

24. A lightweight camera as in claim 21, wherein the frame includes titanium.

* * * * *